(12) United States Patent
Bardon et al.

(10) Patent No.: US 6,657,642 B1
(45) Date of Patent: Dec. 2, 2003

(54) USER INTERACTIVE DISPLAY INTERFACES WITH MEANS FOR INTERACTIVE FORMATION OF COMBINATION DISPLAY OBJECTS REPRESENTATIVE OF COMBINED INTERACTIVE FUNCTIONS

(75) Inventors: Didier Daniel Claude Bardon, Austin, TX (US); Richard Edmond Berry, Georgetown, TX (US); Scott Harlan Isensee, Georgetown, TX (US); Shirley Lynn Martin, Austin, TX (US); John Martin Mullaly, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 970 days.

(21) Appl. No.: 08/887,830

(22) Filed: Jul. 3, 1997

(51) Int. Cl.[7] .................................................. G06F 3/14
(52) U.S. Cl. ...................................... 345/762; 345/764
(58) Field of Search ................................ 345/329, 333, 345/334, 339, 355, 336, 356, 357, 419, 976, 733, 762, 765, 764, 848, 853, 854

(56) References Cited

U.S. PATENT DOCUMENTS

| | | | | |
|---|---|---|---|---|
| 5,394,521 A | * | 2/1995 | Henderson, Jr. et al. | 345/356 |
| 5,515,486 A | * | 5/1996 | Amro et al. | 345/437 |
| 5,555,354 A | * | 9/1996 | Strasnick et al. | 345/427 |
| 5,566,294 A | * | 10/1996 | Kojima et al. | 345/355 |
| 5,835,094 A | * | 11/1998 | Ermel et al. | 345/355 |

* cited by examiner

*Primary Examiner*—Cao Nguyen
(74) *Attorney, Agent, or Firm*—Mark E. McBurney; Volel Emile; J. B. Kraft

(57) ABSTRACT

A system, method and computer program are provided for an interactive data processor controlled display interface wherein the user may dynamically select a plurality of objects (tools) and combine these tools into a combination tool which simultaneously performs the combined interactive functions of the individual tools. The invention is particularly effective when the combined functions being performed are graphic in nature and the results of the combination are shown on the display.

18 Claims, 6 Drawing Sheets

US 6,657,642 B1

USER INTERACTIVE DISPLAY INTERFACES WITH MEANS FOR INTERACTIVE FORMATION OF COMBINATION DISPLAY OBJECTS REPRESENTATIVE OF COMBINED INTERACTIVE FUNCTIONS

TECHNICAL FIELD

The present invention relates to user interactive computer supported display technology and particularly to such user interactive systems and methods which are user friendly, i.e. provide even non-computer-literate users with an interface environment which is easy to use and intuitive.

BACKGROUND OF THE INVENTION AND PRIOR ART

The 1990's decade has been marked by a societal technological revolution driven by the convergence of the data processing industry with the consumer electronics industry. This advance has been even further accelerated by the extensive consumer and business involvement in the internet over the past two years. As a result of these changes, it seems as if virtually all aspects of human endeavor in the industrialized world requires human-computer interfaces. As a result of these profound changes, there is a need to make computer directed activities accessible to a substantial portion of the world's population which, up to a year or two ago, was computer-illiterate, or at best computer indifferent. In order for the vast computer supported market places to continue and be commercially productive, it will be necessary for a large segment of computer indifferent consumers to be involved in computer interfaces.

For at least a decade, it has been recognized that interactive user interfaces to computer displays are made more friendly and easier to use if graphics objects are presented to the user in place of alphanumerics. These graphic objects, such as icons or three-dimensional functional objects, prompt and present to the interactive user, hopefully, intuitive means for initiating and carrying out various computer functions. Such objects are often referred to as tools since they are in effect the tools through which the user may get the computer to perform various functions within the computer's capability. In the conventional use of such tools, if the user wishes to perform several functions or a combination of functions, particularly with respect to computer graphics or other computer functions, the results of which are interactively presented to the user on the display screen, the user proceeds to select a tool appropriate to a first function and perform the function, followed by selection of a tool appropriate to a second function and performing the function. Then the user selects again an object representative of a tool for performing a third function, carries out the function and so on until the combination of functions is completed. Such processes are obviously relatively slow and may at times become complex and cumbersome because upon the completion of each function, the user must ensure that the selection of an appropriate object tool and the performance of the next function is sufficiently interrelated to the earlier function that the combination of function meshes.

As will be hereinafter described, the present invention provides an advance over conventional processes, by permitting the interactive user to select directly during his interactive session an appropriate object or tool which combines the functions he desires to combine and then performs the combined functions simultaneously. It is recognized that in the past, designers of object interface tools have, at times, combined functions in such tools. However, this was done at the design or program development level, and not at the user interface whereat the user may form his combined tools dynamically during interactive work sessions and carry out the combined functions with a single combination tool or object.

SUMMARY OF THE INVENTION

The present invention is directed to interactive computer controlled display systems and particularly to such systems where the user interacts with a plurality of selected functional objects on the display to provide combined graphic results on the display. Means are provided for designating a set of objects respectively providing functions which the user wishes to interactively carry out with respect to the display. The system includes means for combining the designated objects into a single combination object which has an image representative of the combined functions. Then, user interactive means are provided by which the user may activate the combination object to perform the combined functions simultaneously.

It should be understood that the present invention involving the dynamic interactive combination of objects representing functions selected by the user at the display to provide a combination object may be readily implemented in two-dimensional display technologies. However, with the advance of three-dimensional technology over the past few years, more aesthetically interesting user interfaces in accordance with the present invention may be provided by implementing three-dimensional technology wherein three-dimensional objects and three-dimensional combination objects function in a three-dimensional workspace environment.

In addition, implementation of the present invention may be expedited by implementing the display objects using object oriented technologies. In such object oriented display technologies, data representative of each displayed object and the data for performing the respective interactive functions of each object are stored together as a single programming entity. An advantage of object oriented programming is that programs supporting display objects have "inheritance" properties. This permits the developer of the programs to be used in implementing the invention to create and provide for subsequent objects related to each other through a class hierarchy. Through this inheritance function, combination objects may be structured so as to inherit properties and functions from the individual objects combined to form the combination object.

DETAILED DESCRIPTION OF THE PREFERRED EMBODIMENT

Figure 1:
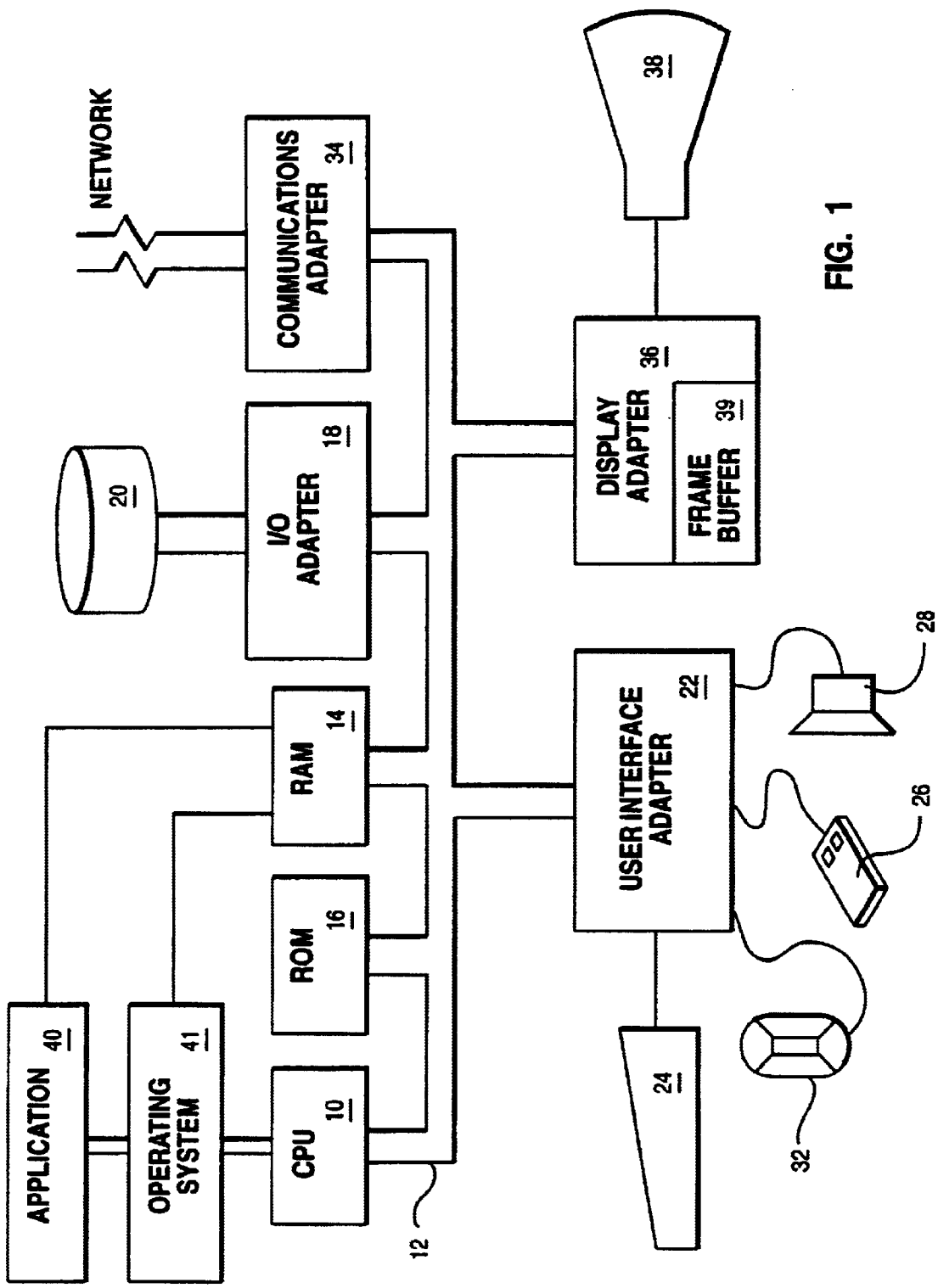
FIG. 1 is a block diagram of a data processing system including a central processing unit which is capable of implementing the present invention.

Before commencing with this embodiment, we wish to emphasize that the key to present invention does not necessarily involve three-dimensional display technology. It will be understood by those skilled in the art that functions of the present invention may be implemented using conventional two-dimensional display technology, by combining images representative of a plurality of interactive functions into a single combination object representative of the combined functions and interactively operable to produce a displayed output of the combined functions simultaneously. With this in mind we will now go on to describe a three-dimensional embodiment of the present invention.

A three-dimensional workspace is a workspace that is perceived as extending in three orthogonal directions. Typically, a display has a two-dimensional display surface and the perception of a third dimension is effected by visual clues such as perspective lines extending toward a vanishing point.

Techniques for providing and handling three-dimensional objects in a three-dimensional virtual workspace have been developed in the art and are available to display user interface designers. U.S. Pat. No. 5,276,785 (Mackinlay et al., Jan. 4, 1994) is an example of the design techniques available to such three-dimensional workspace interface designers.

The embodiments of the present invention may be implemented using object-oriented programming techniques using C++ compiled programming language. The programs are written in human readable script and this script is provided to another program called a compiler to generate a machine readable numeric code which can be loaded into, and directly executed by the computer. The C++ language possesses certain characteristics which allow a software developer to easily use programs written by others while still providing a great deal of control over the reuse of programs to prevent their destruction or improper use. The C++ language is well known and many articles and text are available which describe the language in detail.

While the embodiment of the present invention, which will be subsequently described, can be implemented using object oriented techniques involving the C++ programming language, we found it preferable to use SCL as used in VRT: the Virtual Reality Toolkit developed and marketed by Superscape Ltd. having U.S. offices in Palo Alto, Calif. Extensive details of these programming techniques may be found in the Superscape VRT, Reference Manual, Version 4-00, 2d Edition, Jan. 29, 1996.

It should be understood by those skilled in the art that object oriented programming techniques involve the definition, creation, use and instruction of "objects". These objects are software entities comprising data elements and routines, or methods, which manipulate the data elements. The data and related methods are treated by the software as an entity and can be created, used and deleted as such. The data and functions enable objects to model their real world equivalent entity in terms of its attributes, which can be presented by the data elements, and its behavior which can be represented by its methods.

Objects are defined by creating "classes" which are not objects themselves, but which act as templates which instruct a compiler how to construct the actual object. For example, a class may specify the number and type of data variables and the steps involved in the functions which manipulate the data. An object is actually created in the program by means of a special function called a constructor which uses the corresponding class definition and additional information, such as arguments provided during object creation, to construct the object. Objects are destroyed by a special function called a destructor.

A property of object oriented programming is inheritance which allows program developers to reuse pre-existing programs. Inheritance allows a software developer to define classes and the objects which are later created from them as related through a class hierarchy. Specifically, classes may be designated as subclasses of other base classes. A subclass "inherits" and has access to all of the public functions of its base classes as though these functions appeared in the subclass. Alternatively, a subclass can override some or all of its inherited functions or may modify some or all of its inherited functions by defining a new function with the same form.

The creation of a new subclass borrowing the functionality of another class allows software developers to easily customize existing code to meet their particular needs.

The above-described Superscape Virtual Reality Toolkit (VRT) provides the architectural guidance and modeling, but at the same time frees developers to supply specific actions unique to the particular problem domain which the developer is addressing. Those skilled in the art will understand how the present invention is implemented using object oriented programming techniques as described above. With this background of the various expedients which may be used to implement the present invention, the preferred embodiments will now be described.

Referring to FIG. 1, a typical data processing system is shown which may be used in conjunction with object oriented software in implementing the present invention. A central processing unit (CPU), such as one of the PowerPC microprocessors available from International Business Machines Corporation (PowerPC is a trademark of International Business Machines Corporation) is provided and interconnected to various other components by system bus 12. An operating system 41 runs on CPU 10 and provides control and is used to coordinate the function of the various components of FIG. 1. Operating system 41 may be one of the commercially available operating systems such as DOS, or the OS/2 operating system available from International Business Machines Corporation (OS/2 is a trademark of International Business Machines Corporation). A program application such as the program in the above-mentioned VRT platform 40 runs in conjunction with operating system 41 and provides output calls to the operating system 41 which implements the various functions to be performed by the application 40.

A read only memory (ROM) 16 is connected to CPU 10, via bus 12 and includes the basic input/output system (BIOS) that controls the basic computer functions. Random access memory (RAM) 14, I/O adapter 18 and communications adapter 34 are also interconnected to system bus 12. It should be noted that software components including the operating system 41 and application 40 are loaded into RAM 14 which is the computer system's main memory. I/O adapter 18 may be a small computer system interface (SCSI) adapter that communicates with the disk storage device 20, i.e. a hard drive. Communications adapter 34 interconnects bus 12 with an outside network enabling the data processing system to communicate with other such systems over a local area network (LAN), wide area network (WAN), or the like. I/O devices are also connected to system bus 12 via user interface adapter 22 and display adapter 36. Keyboard 24, trackball 32, mouse 26 and speaker 28 are all interconnected to bus 12 through user interface adapter 22. Display adapter 36 includes a frame buffer 39 which is a storage device that holds a representation of each pixel on the display screen 38. Images may be stored in frame buffer 39 for display on monitor 38 through various components such as a digital to analog converter (not shown) and the like. By using the aforementioned I/O devices, a user is capable of inputting information to the system through the keyboard 24, trackball 32 or mouse 26 and receiving output information from the system via speaker 28 and display 38.

There will now be described a simple illustration of the present invention. When the images are described it will be understood that these may be rendered by storing a three-dimensional image creation program in RAM 14 of the system of FIG. 1. Also stored on the RAM will be a suitable operating system such as DOS or Windows.

With reference to FIGS. 2 through 6, a very simple and basic embodiment of the present invention will be described. For the purpose of this illustration, we will describe a simple graphics creation operation where the objects, i.e. the drawing tools have been combined into a single combination object. In this description, it will be understood that all of the pointing to and moving of objects can be accomplished through a device such as mouse 26 or FIG. 1, which operates through the user interface 22 to call upon appropriate programs stored in RAM 14 cooperating with the operating system 41 to create the images in frame buffer 39 of display adapter 36 (FIG. 1.) to control the display monitor 38.

Figure 2:
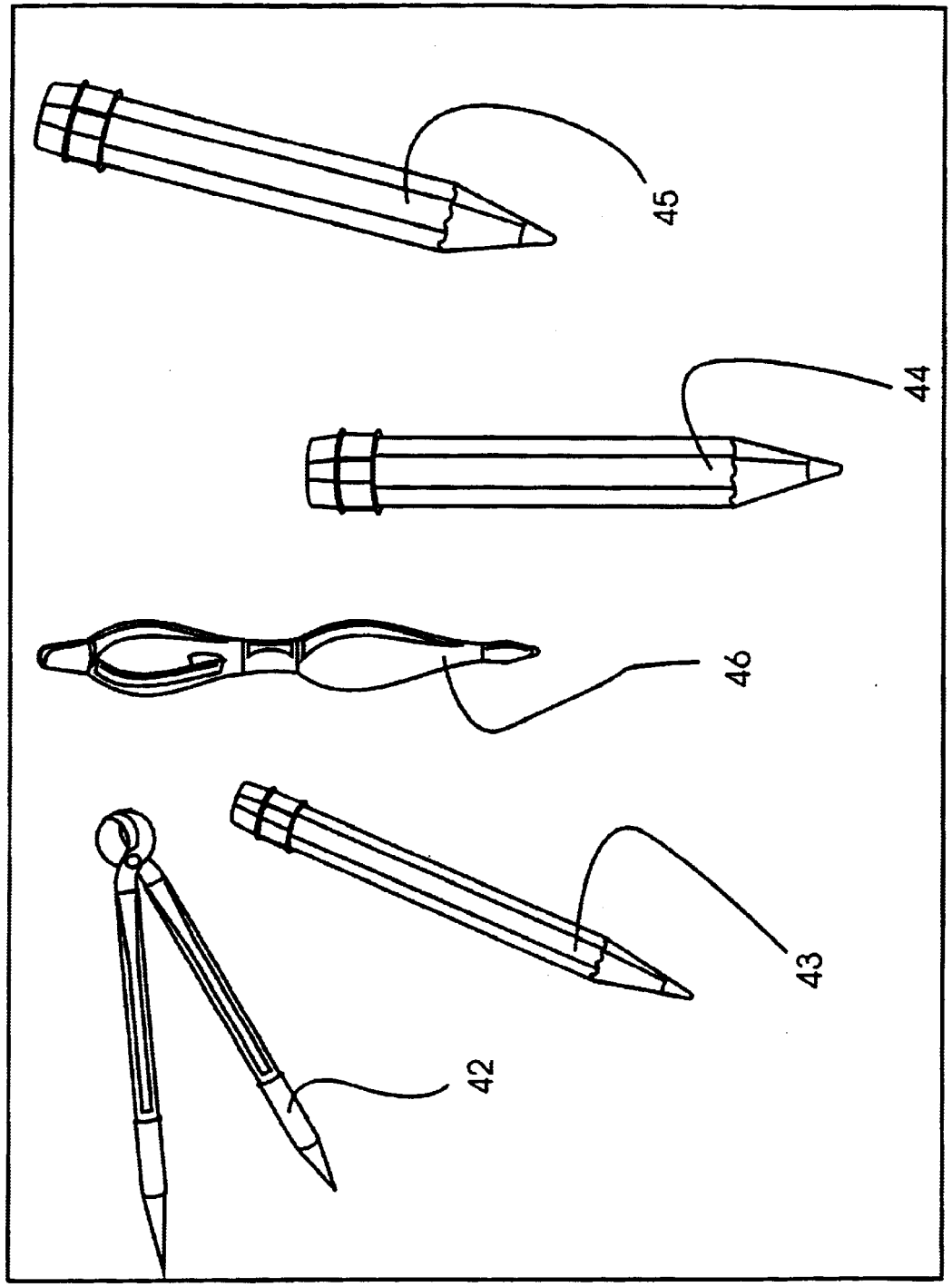
FIG. 2 contains images of some of the individual objects (tools) which are to be combined in carrying out the present invention.

With reference to FIG. 2, for purposes of the present illustration, the system contains stored and displayable functional objects such as compass 42, pencil 43, crayons of various properties 44 and 45, as well paint brush tipped object 46.

Figure 3:
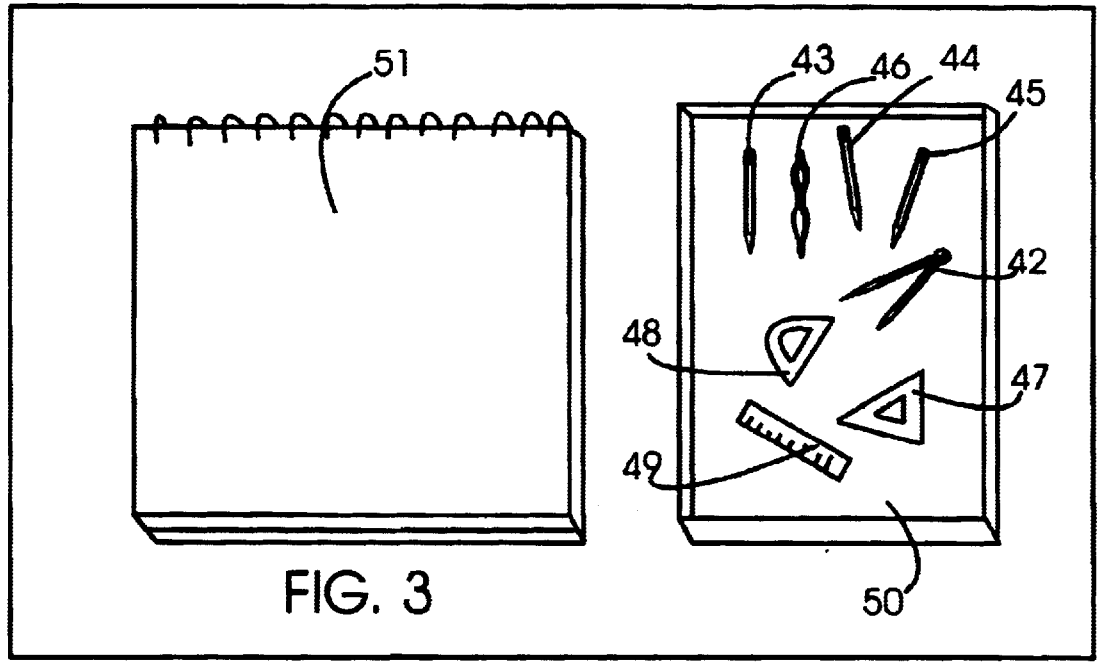
FIG. 3 is a diagrammatic representation of a toolbox containing some examples of tools which may be combined in the carrying out of the present invention, as well as a work surface upon which the combined tools may function.
Figure 4:
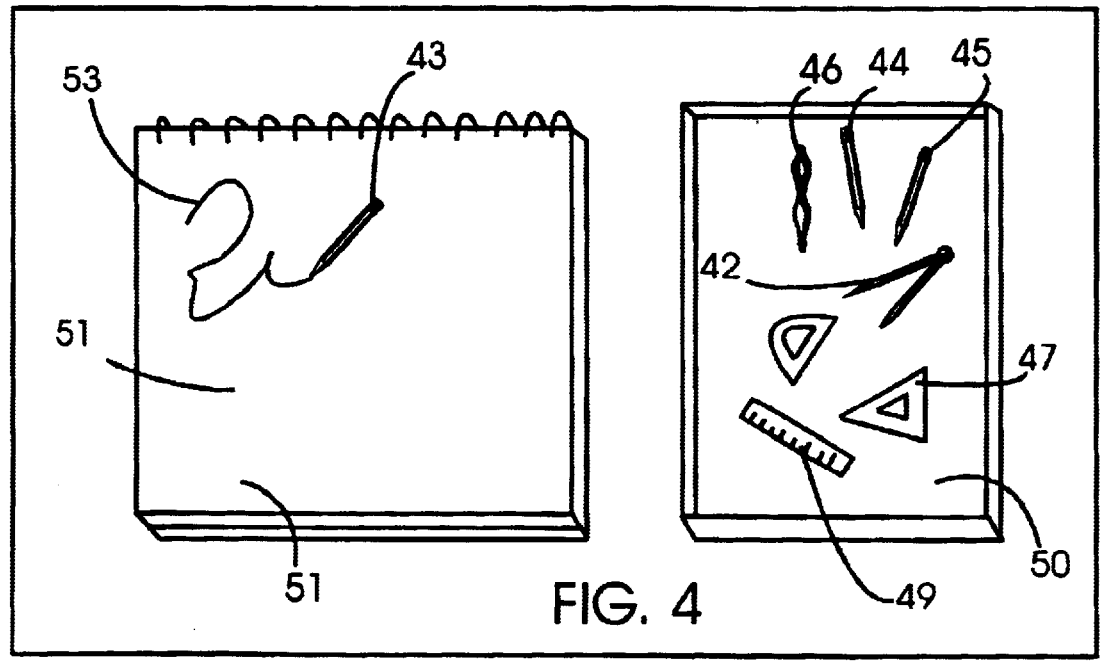
FIG. 4 is the structure of FIG. 3 after an individual object (tool) has carried out a simple graphics function.

Now with reference to FIG. 3 let us consider how the present program is run. All of the objects which includes objects 42 through 46 plus triangle object 47, protractor object 48 and ruler object 49, are all displayed within a container, toolbox 50. A three-dimensional object 51, i.e. a pad on which the drawing is to be done is also displayed. Any one of the objects in the toolbox may be selected and run to perform its individual function (e.g. in FIG. 4, pencil 43 is selected and moved by appropriate means such as mouse system 26 of FIG. 1 to create a pencil drawing 53).

Figure 5:
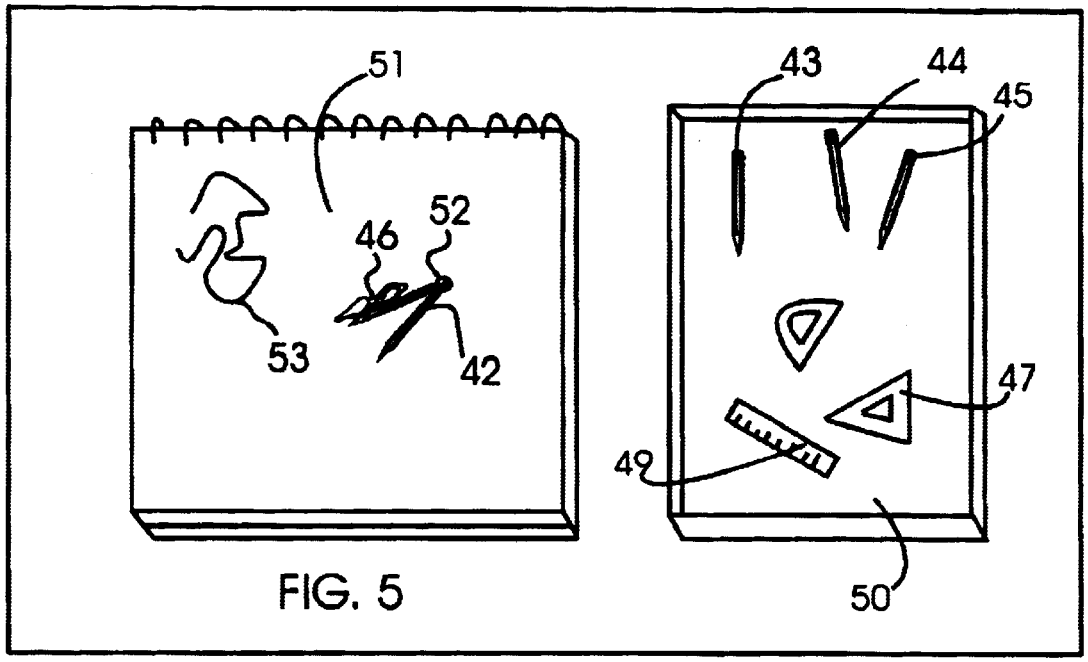
FIG. 5 is the structure of FIG. 3 at a stage where the user has selected two tools and has created a combination object.
Figure 6:
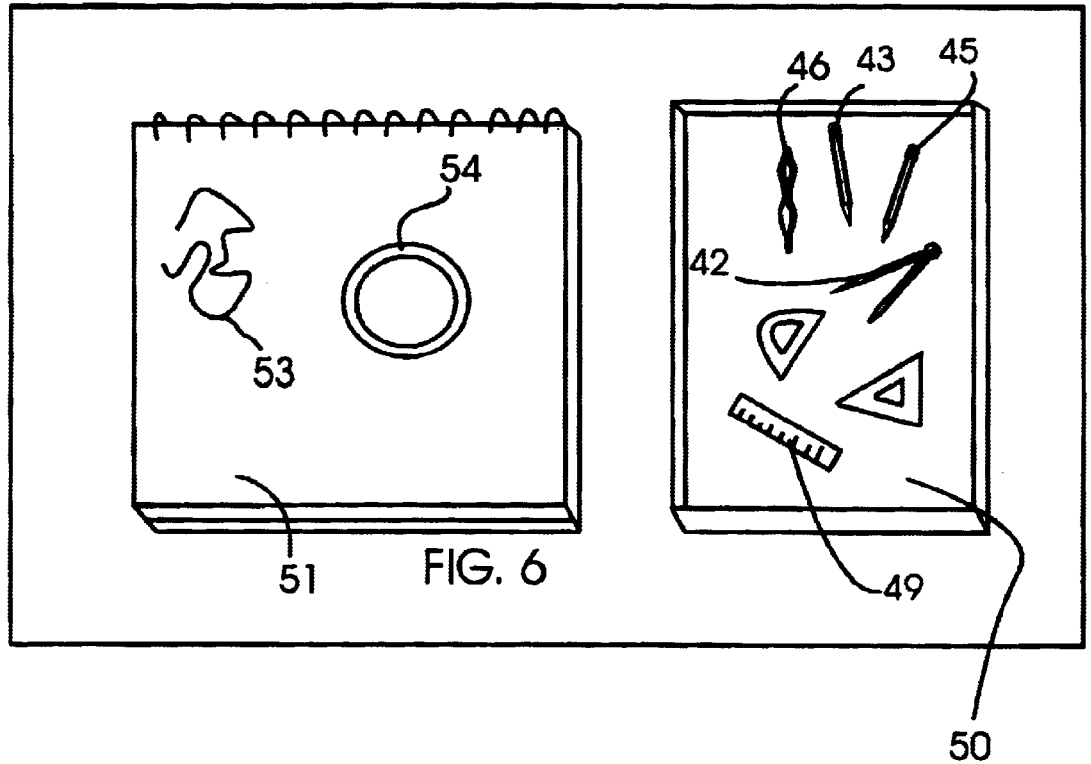
FIG. 6 is the structure of FIG. 5 after the combination tool has produced a combined graphics function and has been disassembled and returned to the toolbox.

Now, in accordance with the present invention as shown in FIG. 5, the user wishes to perform a combination of functions, i.e. a painted circle. He selects the combination of painting tool 46 and compass 42 from his toolbox 50. Upon this selection, the two individually functioning tools are combined to form a combination tool 52, i.e. a compass 42 in combination with a paint brush tool 46. By selecting a desired radius for the compass, this combination tool 52 operates to form the painted circle 54 in FIG. 6.

Figure 7A:
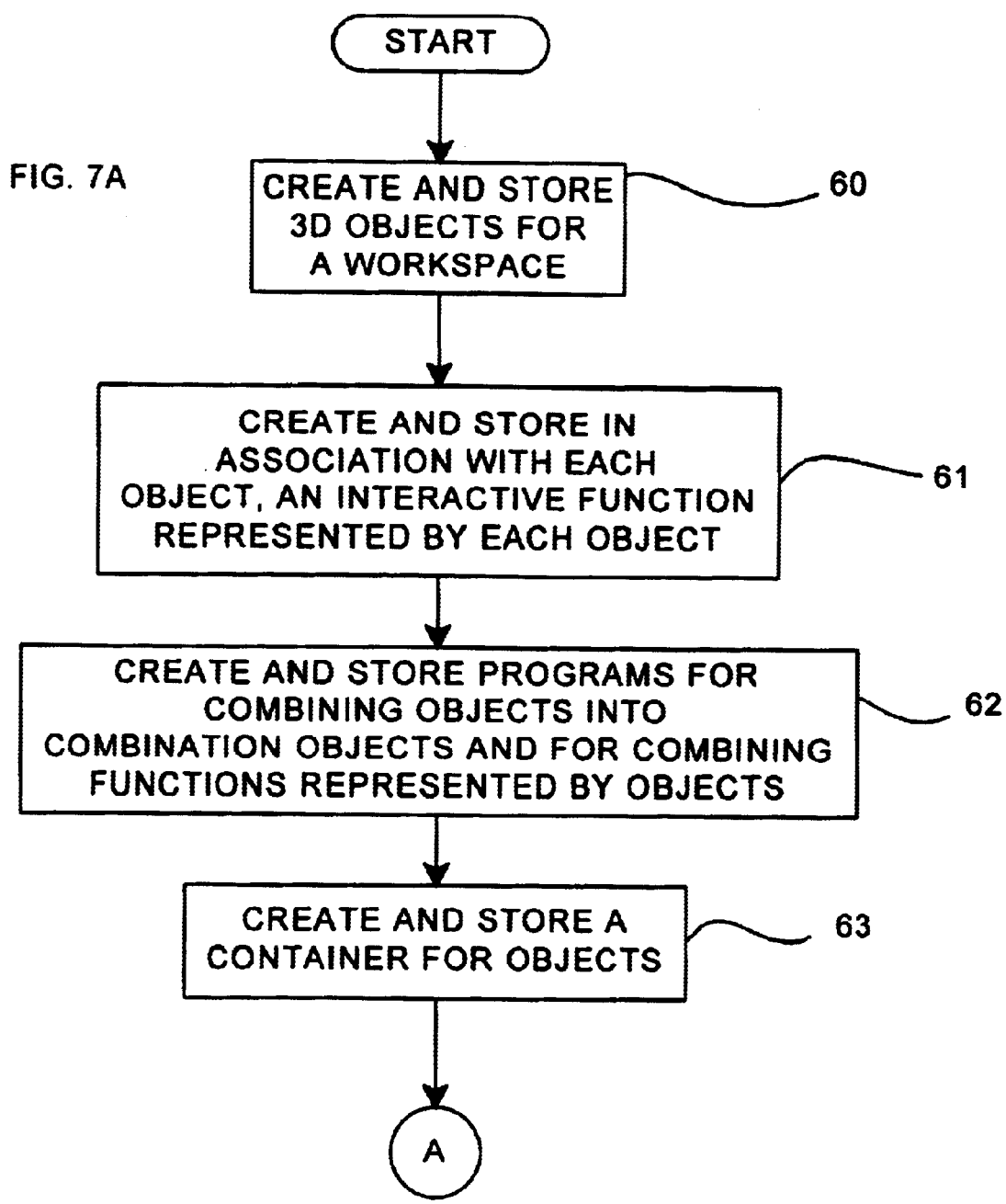
FIGS. 7A and 7B are flowcharts of the process implemented by the present invention, showing in FIG. 7A how the system of the present invention may be designed and in FIG. 7B how the method of the present invention functions.
Figure 7B:
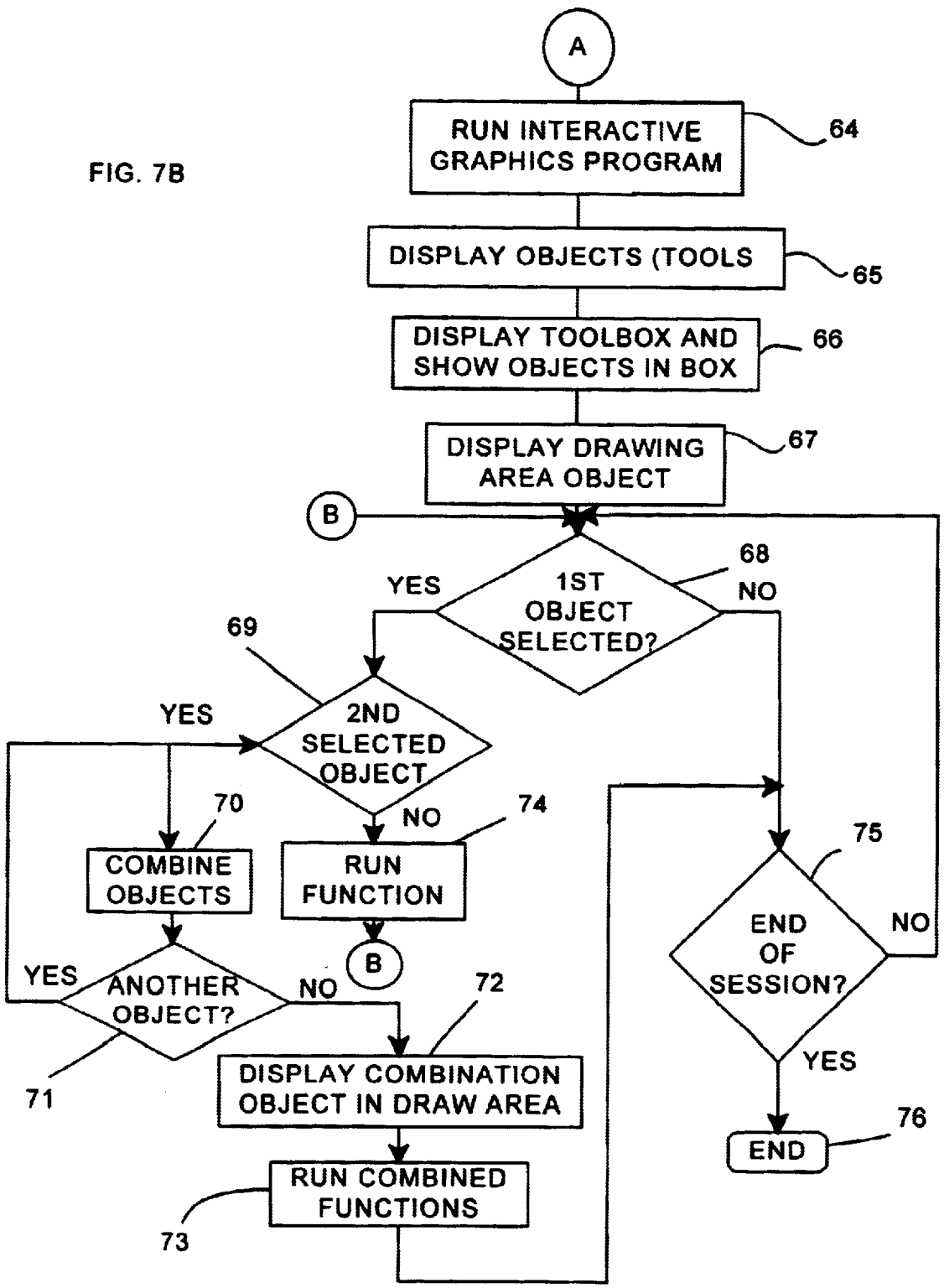

Now with reference to FIGS. 7A and 7B, we will describe a process implemented by the present invention in conjunction with the flowcharts of these figures. The flowcharts are in two parts. The steps in FIG. 7A broadly relate to the development of the representative objects, the storage of such objects in combination with data supporting the functions which these objects represent and programs for creating the combination objects and the combination of functions represented by the combination objects. FIG. 7B is a flowchart of the method of the present invention.

First, step 60, FIG. 7A, the desired three-dimensional objects and their appropriate workspace objects are created and stored by the program designer. Next, step 61, interactive functions represented by each of the objects are created and stored in association with their corresponding objects. Then, step 62, there are created and stored the programs for combining the objects into combination objects and combining the functions represented by the objects into combined functions respectively represented by the combination objects. At this point, step 63, a suitable container for the objects is created and stored.

The process now proceeds to point A in FIG. 7B. At this point, the previously created interactive graphics programs are run, step 64. The objects are displayed, step 65, and the toolbox is displayed, step 66, with the objects in the toolbox so that the interactive user may make appropriate selections from his three-dimensional toolbox. Since our illustration is going to be graphics, a drawing area object such as pad 51 in FIG. 3 is displayed, step 67.

At this point, decision block 68, a determination is made as to whether the user has selected a first object. If he has, since this is a system which forms combination objects, a further determination is made, decision block 69, as to whether the user has selected a second object. If a second object has been selected, then, step 70, the objects are combined, e.g. in FIG. 5 where the painting tool 46 and compass 42 are combined. Then, a determination is made, decision block 71, as to whether a third or additional object is to be added to the combination. If there is an additional object, the system returns to step 70 where the additional combination is made. On the other hand, if there are no additional objects from decision block 71, then the system proceeds to step 72 where the combination object is displayed and proceeds to run the combined functions represented by the combination object, step 73. After the combined functions are simultaneously run, the system proceeds to decision block 75 where a determination is made as to whether the session is over. If it is, step 76, the run is terminated. If the determination from decision block 75 is that the session is not over, the flow is returned to initial decision block 68 where a determination is made as to whether an additional first object is selected for a new combined function and the previously described procedure is repeated.

At this point it should be noted that in the case where only a first object is selected and no second object is selected, the decision from decision block 69 is no and then the single function is run, step 74, and the system branches back to decision step 68 via entry point B.

Although certain preferred embodiments have been shown and described, it will be understood that many changes and modifications may be made therein without departing from the scope and intent of the appended claims.

What is claimed is:

1. A user interactive data processor controlled display system comprising:
   means for displaying a plurality of selectable user interactive objects for respectively performing interactive graphical functions, the results of said functions being displayed,
   means for designating a set of said objects for combination into a single object, means for combining the designated objects into a single combination object having an image representative of the combined graphical functions, and user interactive means for activating said combination object to perform said combined graphical functions.

2. The display system of claim 1 wherein said set of objects are three-dimensional objects.

3. The display system of claim 2 further including means for storing data representative of each respective displayed object and data for performing the respective interactive functions of each object as a programming entity.

4. The display system of claim 3 further including means for storing data representative of the combination object and data for performing said combined functions as a single programming entity.

5. The display system of claim 1 wherein said display system displays a three-dimensional workspace, said set of designated objects are three-dimensional and said combination object is three-dimensional.

6. A computer implemented method for displaying user interactive objects selectable to perform functions comprising:

displaying a plurality of selectable user interactive objects for respectively performing interactive graphical functions, the results of said functions being displayed, designating a set of said objects for combination into a single object, combining the designated objects into a single combination object, having an image representative of the combined graphical functions, and interactively activating said combination object to perform said combined graphical functions.

7. The method of claim 6 wherein said set of objects are three-dimensional objects.

8. The method of claim 7 further including the steps of storing data representative of each respective displayed object and the data for performing the respective interactive function of each object as a programming entity.

9. The method of claim 8 further including the step of storing data representative of said combination object and the data for performing the combined functions as a single programming entity.

10. The method of claim 6 wherein a three-dimensional workspace is displayed, said set of designated objects are three-dimensional and said combination object is three-dimensional.

11. A computer program having data structures included on a computer readable medium which causes the display on a data processor supported display of user interactive objects selectable to perform functions comprising:

means for displaying a plurality of selectable user interactive objects for respectively performing interactive graphical functions, the results of said functions being displayed, means for designating a set of said objects for combination into a single object, means for combining the designated objects into a single combination object having an image representative of the combined graphical functions, and user interactive means for activating said combination object to perform said combined graphical functions.

12. The computer program according to claim 11 wherein said set of objects are three-dimensional objects.

13. The computer program according to claim 12 further including means for storing data representative of each respective displayed object and data for performing the respective interactive functions of each object as a programming entity.

14. The computer program according to claim 13 further including means for storing data representative of the combination object and data for performing said combined functions as a single programming entity.

15. The computer program according to claim 11 wherein said display system displays a three-dimensional workspace, said set of designated objects are three-dimensional and said combination object is three-dimensional.

16. A data processor controlled user interactive display interface comprising:

means for displaying a plurality of selectable user interactive objects for respectively performing user interactive graphical functions, the results of said functions being displayed, means for a user pointing to a set of said objects for combination into a single object, means for the user interactively combining on said interface, the designated objects into a single combination object having an image representative of the combined graphical functions, and user interactive means for manipulating said combination object on said interface to perform said combined graphical functions.

17. A method for user interactive manipulation of interactive objects to perform graphical functions on a data processor controlled display interface comprising:

displaying a plurality of selectable user interactive objects for respectively performing user interactive graphical functions, the results of said functions being displayed, pointing to a set of said objects by said user for combination into a single object, user interactive combining on said interface, the designated objects into a single combination object having an image representative of the combined graphical functions, and user interactively manipulating said combination object on said interface to perform said combined graphical functions.

18. A computer program having data structures included on a computer readable medium which controls the display on a data processor supported user interactive display interface of user interactive objects manipulatable to perform graphical functions comprising:

means for displaying a plurality of selectable user interactive objects for respectively performing user interactive graphical functions, the results of said functions being displayed, means for a user pointing to a set of said objects for combination into a single object, means for the user interactively combining on said interface, the designated objects into a single combination object having an image representative of the combined graphical functions, and user interactive means for manipulating said combination object on said interface to perform said combined graphical functions.

* * * * *